(12) United States Patent
Archer et al.

(10) Patent No.: US 8,458,722 B2
(45) Date of Patent: Jun. 4, 2013

(54) THREAD SELECTION ACCORDING TO PREDEFINED POWER CHARACTERISTICS DURING CONTEXT SWITCHING ON COMPUTE NODES

(75) Inventors: Charles J. Archer, Rochester, MN (US); Michael A. Blocksome, Rochester, MN (US); Amanda E. Peters, Rochester, MN (US); Joseph D. Ratterman, Rochester, MN (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1350 days.

(21) Appl. No.: 12/135,604

(22) Filed: Jun. 9, 2008

(65) Prior Publication Data

US 2009/0307708 A1 Dec. 10, 2009

(51) Int. Cl.
*G06F 9/46* (2006.01)
(52) U.S. Cl.
USPC .......................................... 718/108; 718/102
(58) Field of Classification Search
None
See application file for complete search history.

(56) References Cited

U.S. PATENT DOCUMENTS

| | | | |
|---|---|---|---|
| 5,063,562 A | 11/1991 | Barzilai et al. | |
| 5,095,444 A | 3/1992 | Motles | |
| 5,491,691 A | 2/1996 | Shtayer et al. | |
| 5,535,373 A | 7/1996 | Olnowich | |
| 5,850,539 A | 12/1998 | Cook et al. | |
| 5,859,981 A | 1/1999 | Levin et al. | |
| 5,862,381 A | 1/1999 | Advani et al. | |
| 5,912,893 A | 6/1999 | Rolfe et al. | |
| 5,918,020 A | 6/1999 | Blackard et al. | |
| 5,937,201 A | 8/1999 | Matsushita et al. | |
| 5,953,336 A | 9/1999 | Moore et al. | |
| 5,982,771 A | 11/1999 | Caldara et al. | |
| 6,057,839 A | 5/2000 | Advani et al. | |
| 6,115,357 A | 9/2000 | Packer et al. | |
| 6,118,777 A | 9/2000 | Sylvain | |
| 6,126,331 A | 10/2000 | Komatsu et al. | |
| 6,167,490 A | 12/2000 | Levy et al. | |
| 6,253,372 B1 | 6/2001 | Komatsu et al. | |
| 6,336,143 B1 | 1/2002 | Diedrich et al. | |
| 6,438,702 B1 | 8/2002 | Hodge | |

(Continued)

FOREIGN PATENT DOCUMENTS

GB 2426360 A 11/2006

OTHER PUBLICATIONS

Tanenbaum, Andrew S; "Structured Computer Organization", 1984, Prentice-Hall, 2nd Edition, pp. 10-12.*

(Continued)

*Primary Examiner* — Mengyao Zhe
*Assistant Examiner* — Eric Wai
(74) *Attorney, Agent, or Firm* — Biggers & Ohanian, LLP

(57) ABSTRACT

Methods, apparatus, and products are disclosed for thread selection during context switching on a plurality of compute nodes that includes: executing, by a compute node, an application using a plurality of threads of execution, including executing one or more of the threads of execution; selecting, by the compute node from a plurality of available threads of execution for the application, a next thread of execution in dependence upon power characteristics for each of the available threads; determining, by the compute node, whether criteria for a thread context switch are satisfied; and performing, by the compute node, the thread context switch if the criteria for a thread context switch are satisfied, including executing the next thread of execution.

15 Claims, 7 Drawing Sheets

U.S. PATENT DOCUMENTS

| | | | |
|---|---|---|---|
| 6,490,566 B1 | 12/2002 | Schmidt | |
| 6,600,721 B2 | 7/2003 | Edholm | |
| 6,760,852 B1 | 7/2004 | Gulick | |
| 6,775,703 B1 | 8/2004 | Burns et al. | |
| 6,804,632 B2 | 10/2004 | Orenstien et al. | |
| 6,839,829 B1 | 1/2005 | Daruwalla et al. | |
| 7,032,224 B2 | 4/2006 | Kadakia et al. | |
| 7,251,737 B2 | 7/2007 | Weinberger et al. | |
| 7,281,146 B2 | 10/2007 | Nalawadi et al. | |
| 7,284,137 B2 | 10/2007 | Clark et al. | |
| 7,305,569 B2 | 12/2007 | Reilly | |
| 7,330,983 B2 | 2/2008 | Chaparro et al. | |
| 7,458,077 B2 * | 11/2008 | Duke | 718/100 |
| 7,509,244 B1 | 3/2009 | Shakeri et al. | |
| 7,526,661 B2 * | 4/2009 | Nakajima et al. | 713/320 |
| 7,527,558 B2 | 5/2009 | Lavoie et al. | |
| 7,533,282 B2 | 5/2009 | Ohneda et al. | |
| 7,549,069 B2 | 6/2009 | Ishihara et al. | |
| 7,598,702 B2 | 10/2009 | Walrath | |
| 7,697,495 B2 | 4/2010 | Armstrong et al. | |
| 7,716,500 B2 | 5/2010 | Esliger | |
| 7,870,439 B2 | 1/2011 | Fujiyama et al. | |
| 7,885,795 B2 | 2/2011 | Rasmussen et al. | |
| 8,004,234 B2 | 8/2011 | Walrath | |
| 8,103,463 B2 | 1/2012 | Kalgren et al. | |
| 8,179,787 B2 | 5/2012 | Knapp | |
| 2002/0065930 A1 | 5/2002 | Rhodes | |
| 2002/0186660 A1 | 12/2002 | Bahadiroglu et al. | |
| 2003/0021287 A1 | 1/2003 | Lee et al. | |
| 2003/0023825 A1 | 1/2003 | Woo et al. | |
| 2004/0073822 A1 | 4/2004 | Greco et al. | |
| 2004/0111398 A1 | 6/2004 | England et al. | |
| 2004/0153867 A1 | 8/2004 | McAlinden et al. | |
| 2004/0168097 A1 | 8/2004 | Cook et al. | |
| 2004/0264652 A1 | 12/2004 | Erhart et al. | |
| 2005/0055590 A1 | 3/2005 | Farkas et al. | |
| 2005/0177327 A1 | 8/2005 | Banginwar et al. | |
| 2006/0107262 A1 * | 5/2006 | Bodas et al. | 718/100 |
| 2006/0203739 A1 | 9/2006 | Padmanabhan et al. | |
| 2006/0253507 A1 | 11/2006 | Schank et al. | |
| 2006/0282838 A1 | 12/2006 | Gupta et al. | |
| 2007/0005998 A1 | 1/2007 | Jain et al. | |
| 2007/0033367 A1 | 2/2007 | Sakarda et al. | |
| 2007/0067657 A1 | 3/2007 | Ranganathan et al. | |
| 2007/0179760 A1 | 8/2007 | Smith | |
| 2007/0198864 A1 | 8/2007 | Takase | |
| 2007/0252552 A1 | 11/2007 | Walrath | |
| 2007/0300083 A1 | 12/2007 | Goodrum et al. | |
| 2008/0109569 A1 | 5/2008 | Leonard et al. | |
| 2008/0178029 A1 | 7/2008 | McGrane et al. | |
| 2008/0228462 A1 | 9/2008 | Gross et al. | |
| 2008/0234873 A1 | 9/2008 | Gorbatov et al. | |
| 2008/0240115 A1 | 10/2008 | Briscoe et al. | |
| 2008/0313482 A1 | 12/2008 | Karlapalem et al. | |
| 2009/0003344 A1 | 1/2009 | Kumar | |
| 2009/0024819 A1 | 1/2009 | Fisher et al. | |
| 2009/0046585 A1 | 2/2009 | Faraj | |
| 2009/0187658 A1 | 7/2009 | Williams et al. | |
| 2009/0265568 A1 | 10/2009 | Jackson | |
| 2011/0029799 A1 | 2/2011 | Walrath | |

OTHER PUBLICATIONS

Nenad Stankovic Kang Zhang, Visual Programming for Message-Passing Systems (1999), International Journal of Software Engineering and Knowledge Engineering.

Matthew J. Sottile, Vaddadi P. Chandu, David A. Bader, Performance analysis of parallel programs via message-passing graph traversal, College of Computing, Georgia Institute of Technology, Feb. 25, 2006.
Office Action, U.S. Appl. No. 11/946,934, Nov. 24, 2010.
Office Action, U.S. Appl. No. 11/924,934, Aug. 19, 2010.
Notice of Allowance, U.S Appl. No. 11/764,282, Dec. 10, 2010.
Office Action, U.S. Appl. No. 11/832,192, Oct. 29, 2010.
Office Action, U.S. Appl. No. 12/166,748, May 27, 2010.
Office Action, U.S. Appl. No. 12/166,748, Aug. 25, 2010.
Notice of Allowance, U.S. Appl. No. 12/180,963, Oct. 20, 2010.
"MPI-2: Extensions to the Message-Passing Interface," Forum, Nov. 15, 2003.
Notice of Allowance, U.S. Appl. No. 11/764,282, Dec. 10, 2010.
Final Office Action, U.S. Appl. No. 12/166,748, Mar. 7, 2011.
Final Office Action, U.S. Appl. No. 11/832,192, Apr. 13, 2011.
Office Action, U.S. Appl. No. 11/764,333, Apr. 13, 2011.
Final Office Action, U.S. Appl. No. 11/924,934, Feb. 24, 2011.
Notice of Allowance, U.S. Appl. No. 11/946,136, Mar. 4, 2011.
Office Action, U.S. Appl. No. 11/865,921, Feb. 2, 2011.
University of Minnesota Super Computing Institute. 2009. Derived Data Types with MPI.
William Saphir, Message Buffering and It's Effect on the Communications Performance on Parallel Computers. Apr. 1994.
University of Minnesota Super Computing Institute. 2009 MPI Performance Topics.
Final Office Action, U.S. Appl. No. 11/865,981, Jul. 22, 2011.
Huang et al., "DZM: MPI One-Sided Exploitation of LAIP API's Component Design, Communication Protocols & Application Tools Development", Jun. 6, 2006, pp. 1-70, IBM Corporation, Poughkeepsie, NY.
Tanenbaum, Andrew S., "Structured Computer Organization", 1984, Prentice-Hall, $2^{nd}$ Edition, pp. 10-12.
Final Office Action, U.S. Appl. No. 11/764,333, Sep. 2, 2011.
Office Action, U.S. Appl. No. 12/135,604, Nov. 4, 2011.
Notice of Allowance, U.S. Appl. No. 11/832,192, Aug. 11, 2011.
Notice of Allowance, U.S. Appl. No. 12/166,748, Nov. 9, 2011.
Office Action, U.S. Appl. No. 12/127,035, Jan. 5, 2011.
Office Action, U.S. Appl. No. 12/135,593, Mar. 30, 2011.
Office Action, U.S. Appl. No. 12/129,334, Jun. 9, 2011.
Office Action, U.S. Appl. No. 12/129,205, Jun. 3, 2011.
Office Action, U.S. Appl. No. 12/135,593, Aug. 26, 2011.
Office Action, U.S. Appl. No. 12/167,302, Oct. 12, 2011.
Office Action, U.S. Appl. No. 12/135,660, Sep. 29, 2011.
Office Action, U.S. Appl. No. 12/129,319, Sep. 30, 2011.
Notice of Allowance, U.S. Appl. No. 12/127,035, Jun. 13, 2011.
Notice of Allowance, U.S. Appl. No. 12/129,223, Sep. 6, 2011.
Final Office Action, U.S. Appl. No. 12/129,205, Jan. 10, 2012.
Final Office Action, U.S. Appl. No. 12/129,334, Jan. 24, 2012.
Notice of Allowance, U.S. Appl. No. 12/129,319, Feb. 1, 2012.
Final Office Action, U.S. Appl. No. 12/135,604, Apr. 26, 2012.
Office Action, U.S. Appl. No. 12/135,593, Feb. 15, 2012.
Notice of Allowance, U.S. Appl. No. 12/135,660, Jun. 7, 2012.
Notice of Allowance, U.S. Appl. No. 13/277,350, Dec. 14, 2011.
Office Action, U.S. Appl. No. 12/129,334, Sep. 13, 2012.
Office Action, U.S. Appl. No. 12/129,205, Aug. 30, 2012.
Office Action, U.S. Appl. No. 12/770,187, Aug. 6, 2012.
Notice of Allowance, U.S. Appl. No. 13/557,320, Jul. 25, 2012.

* cited by examiner

THREAD SELECTION ACCORDING TO PREDEFINED POWER CHARACTERISTICS DURING CONTEXT SWITCHING ON COMPUTE NODES

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, apparatus, and products for thread selection during context switching on a plurality of compute nodes.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output ('I/O') devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute applications that include both parallel algorithms and serial algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the algorithms of an application are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource—the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In such a manner, a torus network lends itself to point to point operations. In a tree network, the nodes typically are organized in a binary tree arrangement: each node has a parent and two children (although some nodes may only have zero children or one child, depending on the hardware configuration). In computers that use a torus and a tree network, the two networks typically are implemented independently of one another, with separate routing circuits, separate physical links, and separate message buffers. A tree network provides high bandwidth and low latency for certain collective operations, such as, for example, an allgather, allreduce, broadcast, scatter, and so on.

Applications processed using a parallel computer are often implemented using multiple threads of execution. Each thread of execution is a set of computer program instructions that are processed sequentially by a processor of the parallel computer. While the set of computer program instructions within a single thread are processed sequentially, multiple threads may be processed concurrently on each compute node of the parallel computer. To accommodate such concurrent processing, the compute node may execute a first thread for some period of time and then swap the first thread currently being executed for a second thread. After this second thread executes for some period of time, the compute node then swaps the second thread currently being executed for the first thread or some other thread scheduled for execution. Because the different threads typically instruct the processor to utilize the compute node hardware in different ways, the compute node's power consumption may vary as the compute node executes different threads of the application. If all of the threads that result in high power consumption are executed at inopportune times such as, for example, when power prices above a particular power usage threshold are extremely high, then application execution may waste valuable business resources.

SUMMARY OF THE INVENTION

Methods, apparatus, and products are disclosed for thread selection during context switching on a plurality of compute nodes that includes: executing, by a compute node, an application using a plurality of threads of execution, including executing one or more of the threads of execution; selecting, by the compute node from a plurality of available threads of execution for the application, a next thread of execution in dependence upon power characteristics for each of the available threads; determining, by the compute node, whether criteria for a thread context switch are satisfied; and performing, by the compute node, the thread context switch if the criteria for a thread context switch are satisfied, including executing the next thread of execution.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
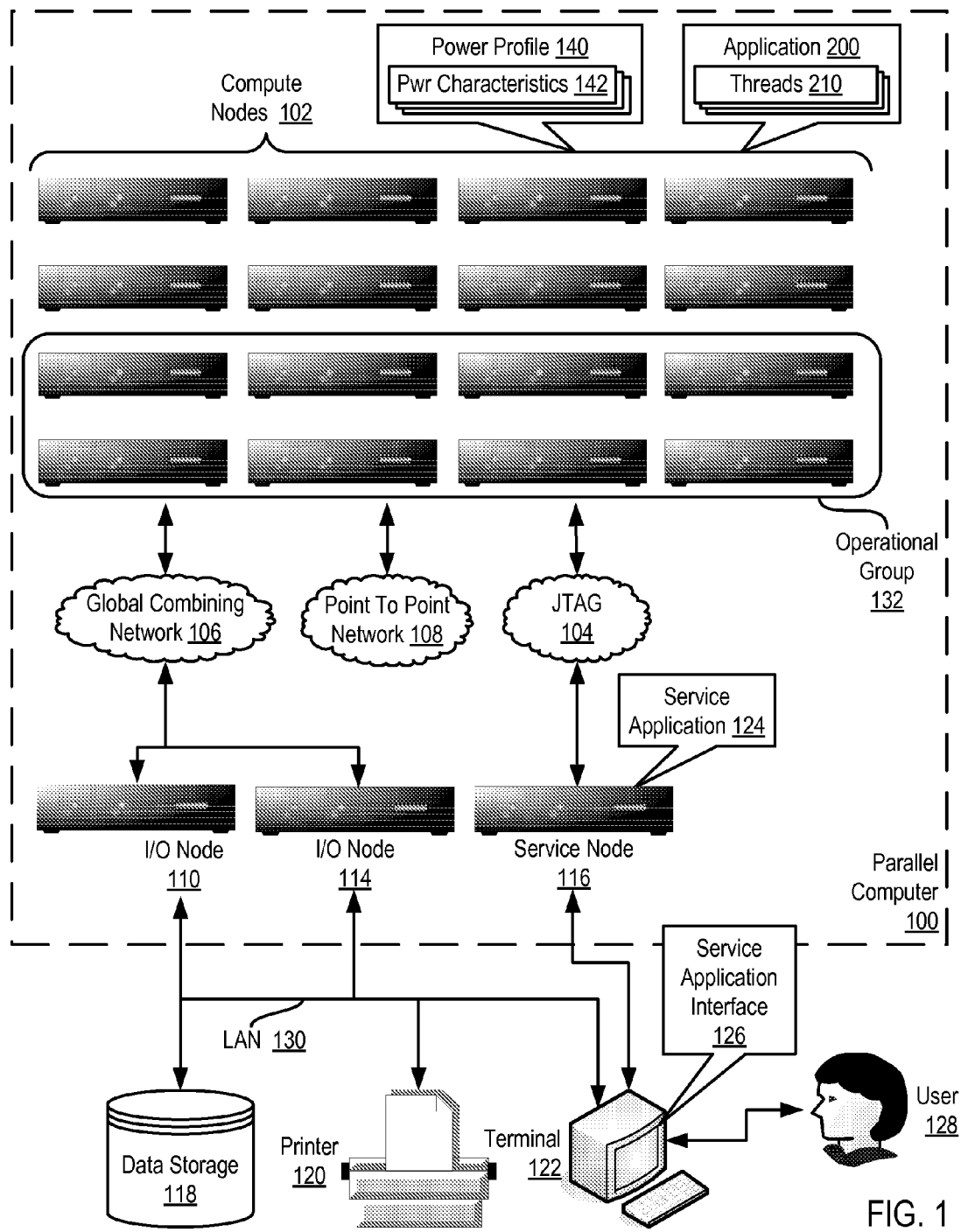
FIG. 1 illustrates an exemplary system for thread selection during context switching on a plurality of compute nodes according to embodiments of the present invention.

Exemplary methods, apparatus, and computer program products for thread selection during context switching on a plurality of compute nodes according to embodiments of the present invention are described with reference to the accompanying drawings, beginning with FIG. 1. FIG. 1 illustrates an exemplary system for thread selection during context switching on a plurality of compute nodes (100) according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102) that execute an application (200). The application (200) of FIG. 1 is a set of computer program instructions that provide user-level data processing.

Each compute node (102) of FIG. 1 may include a plurality of processors for use in executing an application on the parallel computer (100) according to embodiments of the present invention. The processors of each compute node (102) in FIG. 1 are operatively coupled to computer memory such as, for example, random access memory ('RAM'). Each compute node (102) may operate in several distinct modes that affect the relationship among the processors and the memory on that node such as, for example, serial processing mode or parallel processing mode. The mode in which the compute nodes operate is generally set during the node's boot processes and does not change until the node reboots.

In serial processing mode, often referred to a 'virtual node mode,' the processors of a compute node operate independently of one another, and each processor has access to a partition of the node's total memory that is exclusively dedicated to that processor. For example, if a compute node has four processors and two Gigabytes (GB) of RAM, when operating in serial processing mode, each processor may process a thread independently of the other processors on that node, and each processor may access a 512 Megabyte (MB) portion of that node's total 2 GB of RAM.

In parallel processing mode, often referred to as 'symmetric multi-processing mode,' one of the processors acts as a master, and the remaining processors serve as slaves to the master processor. Each processor has access to the full range of computer memory on the compute node. Continuing with the exemplary node above having four processors and 2 GB of RAM, for example, each slave processor may cooperatively process threads spawned from the master processor, and all of the processors have access to the node's entire 2 GB of RAM.

The compute nodes (102) are coupled for data communications by several independent data communications networks including a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer. The links between compute nodes are bi-directional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes in the parallel computer (100) are partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer. For example, in some configurations, each processing set may be composed of eight compute nodes and one I/O node. In some other configurations, each processing set may be composed of sixty-four compute nodes and one I/O node. Such example are for explanation only, however, and not for limitation. Each I/O nodes provide I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

In the example of FIG. 1, the compute nodes (102) have installed upon them a set of computer program instructions capable of thread selection during context switching on a plurality of compute nodes (102) according to embodiments of the present invention. The compute nodes (102) operate generally for thread selection during context switching on a plurality of compute nodes (102) according to embodiments of the present invention by: executing an application (200) using a plurality of threads (210) of execution, including executing one or more of the threads (210) of execution; selecting, from a plurality of available threads (210) of execution for the application (200), a next thread of execution in dependence upon power characteristics (142) for each of the available threads (210); determining whether criteria for a thread context switch are satisfied; and performing the thread context switch if the criteria for a thread context switch are satisfied, including executing the next thread of execution.

A thread context switch is a computing process of storing the state, or 'context,' of a processor currently executing a thread and reconfiguring the processor with another state for executing another thread. At some later processing point during the execution of the other thread, the processor may perform another context switch in which the processor's state is restored to the state it was in when the processor paused execution of the original thread. In such a manner, context switching allows a processor to switch from executing a first thread to executing another thread and back to executing the first thread again, thereby effecting concurrent execution of multiple threads on a single processor. Because such context switching often occurs rapidly after each thread is executed for a small period of time, users often have the impression that the threads are executing simultaneously.

The compute nodes (102) of FIG. 1 may also operate for thread selection during context switching on a plurality of compute nodes according to embodiments of the present invention by predefining the power characteristics (142) of each thread (210) of execution for the application (200). In the example of FIG. 1, the power characteristics (142) of a particular thread describe the power consumed by a compute node when executing that particular thread. The power characteristics (142) of FIG. 1 may describe the powered consumed using an actual value expressed in Watts. In other embodiments, the power characteristics (142) of FIG. 1 may describe the powered consumed using textual semantics such as, for example, 'high,' 'average,' or 'low,' or any other implementations as will occur to those of skill in the art. In some embodiments, the power characteristics (142) may specify the power consumption as a value that reflects the overall power consumption of a compute node during execution of a thread (210) of the application (200). In some other embodiments, the power characteristics (142) may specify the power consumption as a value that reflects the power consumed by individual hardware components of a compute node during execution of a thread (210) of the application (200). The power consumption may be an actual measured value based on historical power consumption data or an estimated value based on those performance metrics such as, for example, the number of floating point operations or integer performed during the thread, the number of collective operation invoked during the thread, the number of cache misses that occur, and so on. In the example of FIG. 1, the power characteristics (142) are stored in a power profile (140) for the application on each of the compute nodes (102). The power profile (140) of FIG. 1 is a data structure that associates power characteristics (142) with the threads (210) of the application (200).

In the example of FIG. 1, the plurality of compute nodes (102) are implemented in a parallel computer (100) and are connected together using a plurality of data communications networks (104, 106, 108). The point to point network (108) is optimized for point to point operations. The global combining network (106) is optimized for collective operations.

Although thread selection during context switching on a plurality of compute nodes according to embodiments of the present invention is described above in terms of an architecture for a parallel computer, readers will note that such an embodiment is for explanation only and not for limitation. In fact, thread selection during context switching on a plurality of compute nodes according to embodiments of the present invention may be implemented using a variety of computer system architectures composed of a plurality of nodes network-connected together, including for example architectures for a cluster of nodes, a distributed computing system, a grid computing system, and so on.

The arrangement of nodes, networks, and I/O devices making up the exemplary system illustrated in FIG. 1 are for explanation only, not for limitation of the present invention. Data processing systems capable of thread selection during context switching on a plurality of compute nodes according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of thread selection during context switching on a plurality of compute nodes according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Figure 2:
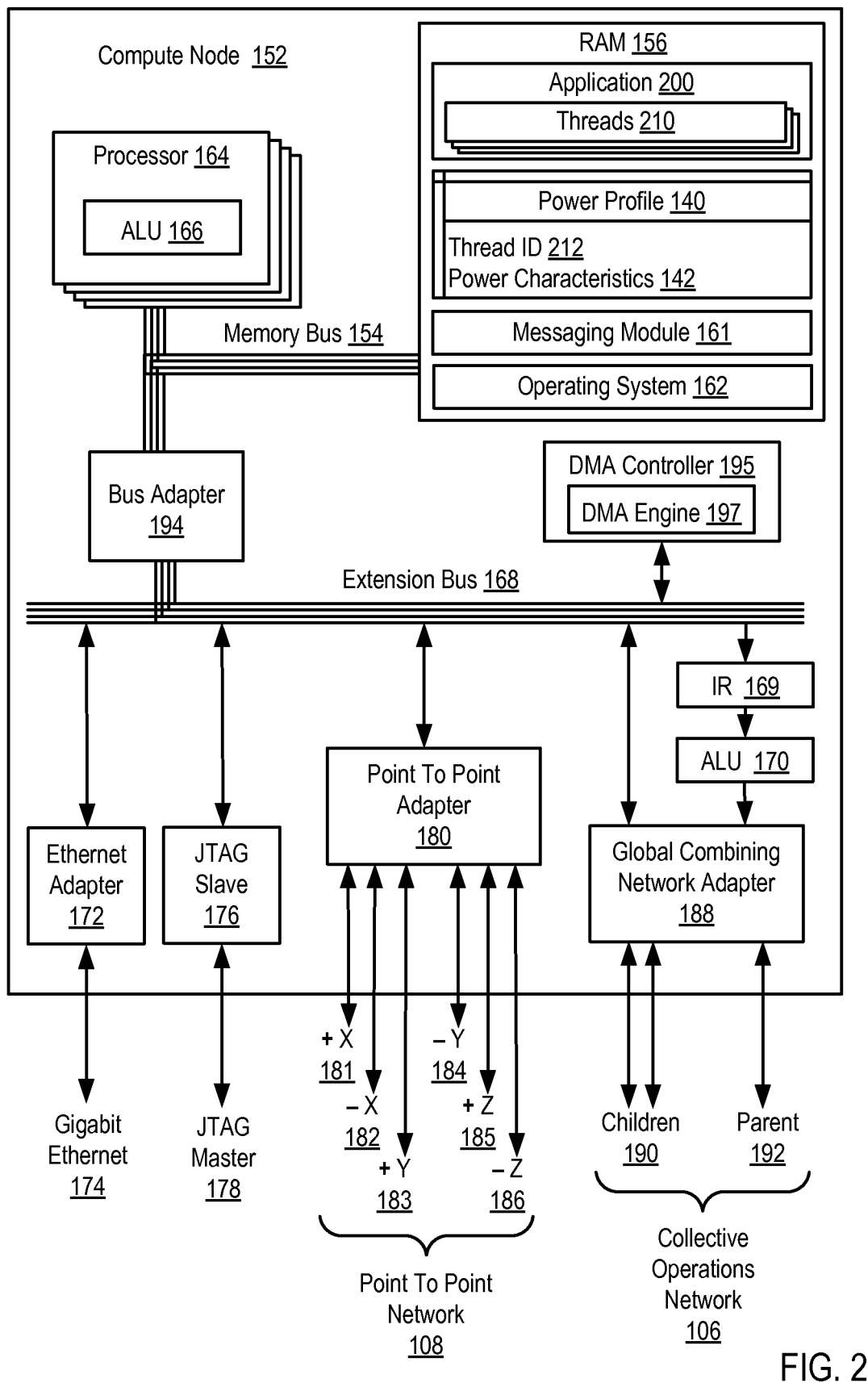
FIG. 2 sets forth a block diagram of an exemplary compute node useful in a parallel computer capable of thread selection during context switching on a plurality of compute nodes according to embodiments of the present invention.

Thread selection during context switching on a plurality of compute nodes according to embodiments of the present invention may be generally implemented on a parallel computer, among other types of exemplary systems. In fact, such computers may include thousands of such compute nodes. Each compute node is in turn itself a kind of computer composed of one or more computer processors, its own computer memory, and its own input/output adapters. For further explanation, therefore, FIG. 2 sets forth a block diagram of an exemplary compute node (152) useful in a parallel computer capable of thread selection during context switching on a plurality of compute nodes according to embodiments of the present invention. The compute node (152) of FIG. 2 includes one or more computer processors (164) as well as random access memory ('RAM') (156). The processors (164) are connected to RAM (156) through a high-speed memory bus (154) and through a bus adapter (194) and an extension bus (168) to other components of the compute node (152). Stored in RAM (156) of FIG. 2 is an application (200). The application (200) is a set of computer program instructions that provide user-level data processing. The application (200) is executing on the compute node (152) using multiple threads (210).

Also stored in RAM (156) is a power profile (140), a data structure that associates power characteristics (142) with each thread (210) of the application (200). Each record of the power profile (140) includes a thread identifier (212) and power characteristics (142). The power characteristics (140) of FIG. 2 describe the power consumed by a compute node when executing the thread identified by the associated thread identifier (212).

Also stored in RAM (156) is a messaging module (161), a library of computer program instructions that carry out parallel communications among compute nodes, including point to point operations as well as collective operations. User-level applications such as application (200) effect data communications with other applications running on other compute nodes by calling software routines in the messaging modules (161). A library of parallel communications routines may be developed from scratch for use in systems according to embodiments of the present invention, using a traditional programming language such as the C programming language, and using traditional programming methods to write parallel communications routines. Alternatively, existing prior art libraries may be used such as, for example, the 'Message Passing Interface' ('MPI') library, the 'Parallel Virtual Machine' ('PVM') library, and the Aggregate Remote Memory Copy Interface ('ARMCI') library.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft Vista™, AIX™, IBM's i5/OS™, and others as will occur to those of skill in the art.

The operating system (162) of FIG. 2 also includes a set of computer program instructions capable of thread selection during context switching on a compute node (152) according to embodiments of the present invention. The operating system (162) operates generally for thread selection during context switching on a compute node (152) according to embodiments of the present invention by: executing an application (200) using a plurality of threads (210) of execution, including executing one or more of the threads (210) of execution; selecting, from a plurality of available threads (210) of execution for the application (200), a next thread of execution in dependence upon power characteristics (142) for each of the available threads (210); determining whether criteria for a thread context switch are satisfied; and performing the thread context switch if the criteria for a thread context switch are satisfied, including executing the next thread of execution. In addition, the operating system (162) may also operate generally for thread selection during context switching on a compute node (152) according to embodiments of the present invention by predefining the power characteristics (142) of each thread (210) of execution for the application (200). Readers will note, however, that in some other embodiments, an application profiler installed on the compute node (152) or some other node may predefine the power characteristics (142) of each thread (210) of execution for the application (200) while profiling the application (200) to measure performance and other metrics concerning the application (200).

The exemplary compute node (152) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in systems for thread selection during context switching on a plurality of compute nodes according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in thread selection during context switching on a plurality of compute nodes according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of processor (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (195), which is computer software for direct memory access. Direct memory access includes reading and writing to memory of compute nodes with reduced operational burden on the central processing units (164). A DMA transfer essentially copies a block of memory from one compute node to another. While the CPU may initiates the DMA transfer, the CPU does not execute it. In the example of FIG. 2, the DMA engine (195) and the DMA controller (195) support the messaging module (161).

Figure 3A:
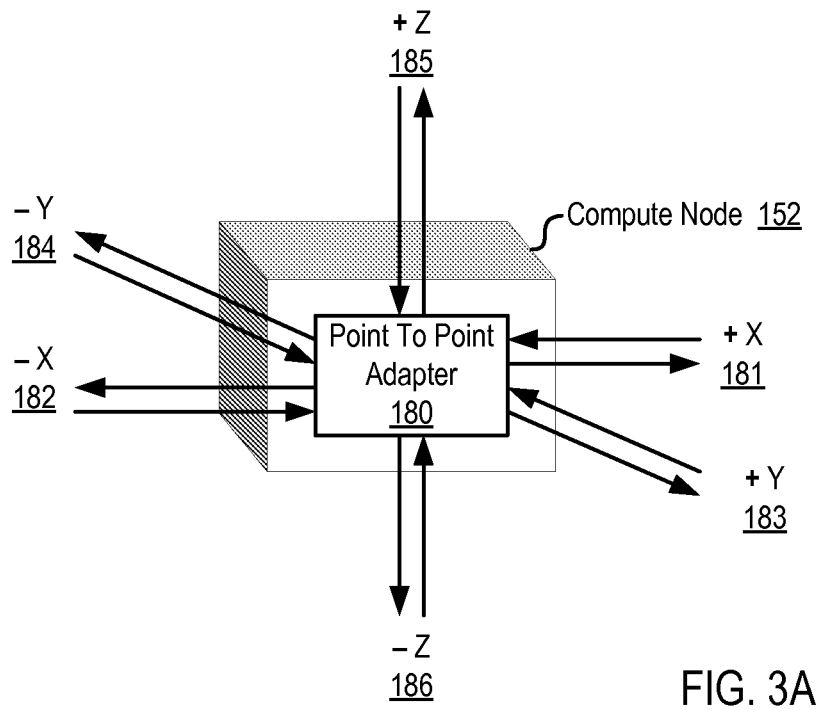
FIG. 3A illustrates an exemplary Point To Point Adapter useful in systems capable of thread selection during context switching on a plurality of compute nodes according to embodiments of the present invention.

For further explanation, FIG. 3A illustrates an exemplary Point To Point Adapter (180) useful in systems capable of thread selection during context switching on a plurality of compute nodes according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
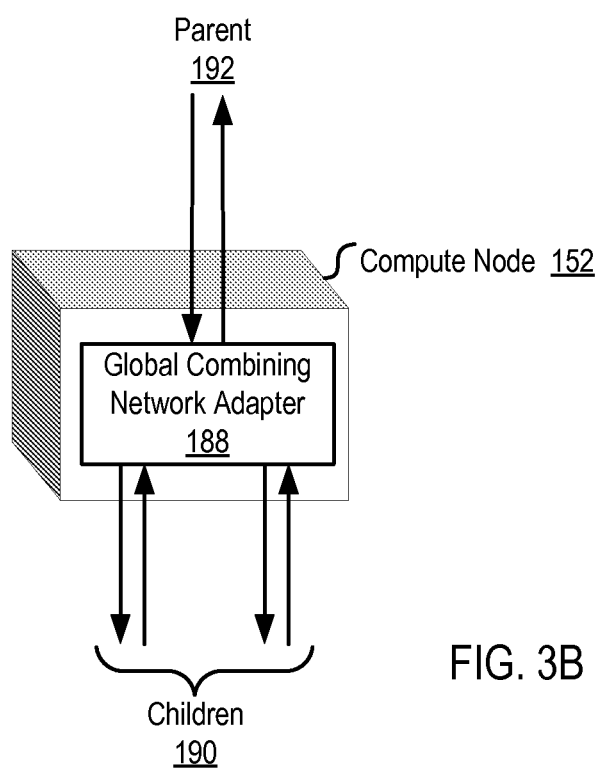
FIG. 3B illustrates an exemplary Global Combining Network Adapter useful in systems capable of thread selection during context switching on a plurality of compute nodes according to embodiments of the present invention.

For further explanation, FIG. 3B illustrates an exemplary Global Combining Network Adapter (188) useful in systems capable of thread selection during context switching on a plurality of compute nodes according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes through four unidirectional data communications links (190). Global Combining Network Adapter (188) also provides data communication to and from a parent node through two unidirectional data communications links (192).

Figure 4:
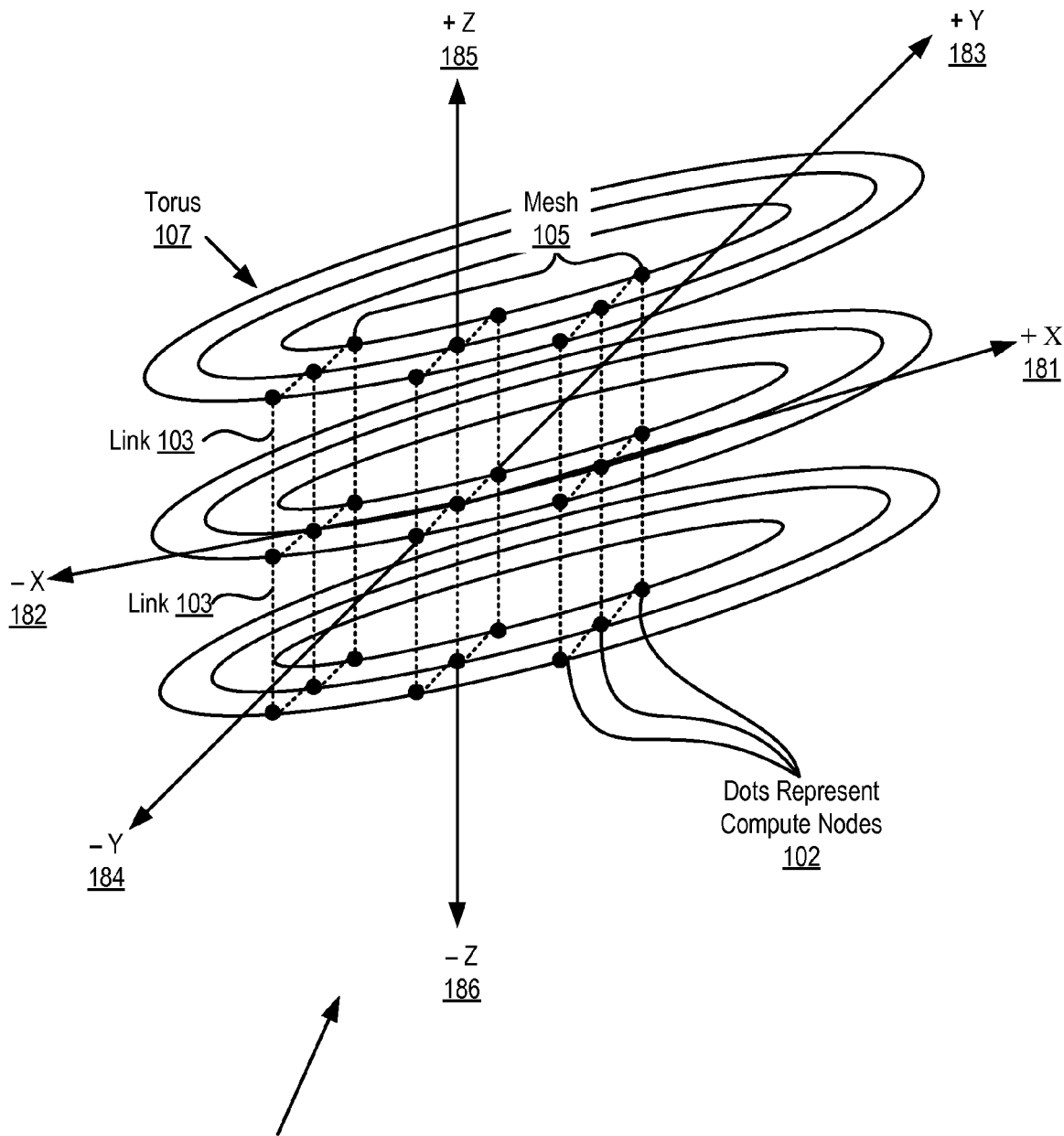
FIG. 4 sets forth a line drawing illustrating an exemplary data communications network optimized for point to point operations useful in systems capable of thread selection during context switching on a plurality of compute nodes in accordance with embodiments of the present invention.

For further explanation, FIG. 4 sets forth a line drawing illustrating an exemplary data communications network (108) optimized for point to point operations useful in systems capable of thread selection during context switching on a plurality of compute nodes in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and fro in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in thread selection during context switching on a plurality of compute nodes in accordance with embodiments of the present invention may contain only a few compute nodes or may contain thousands of compute nodes.

Figure 5:
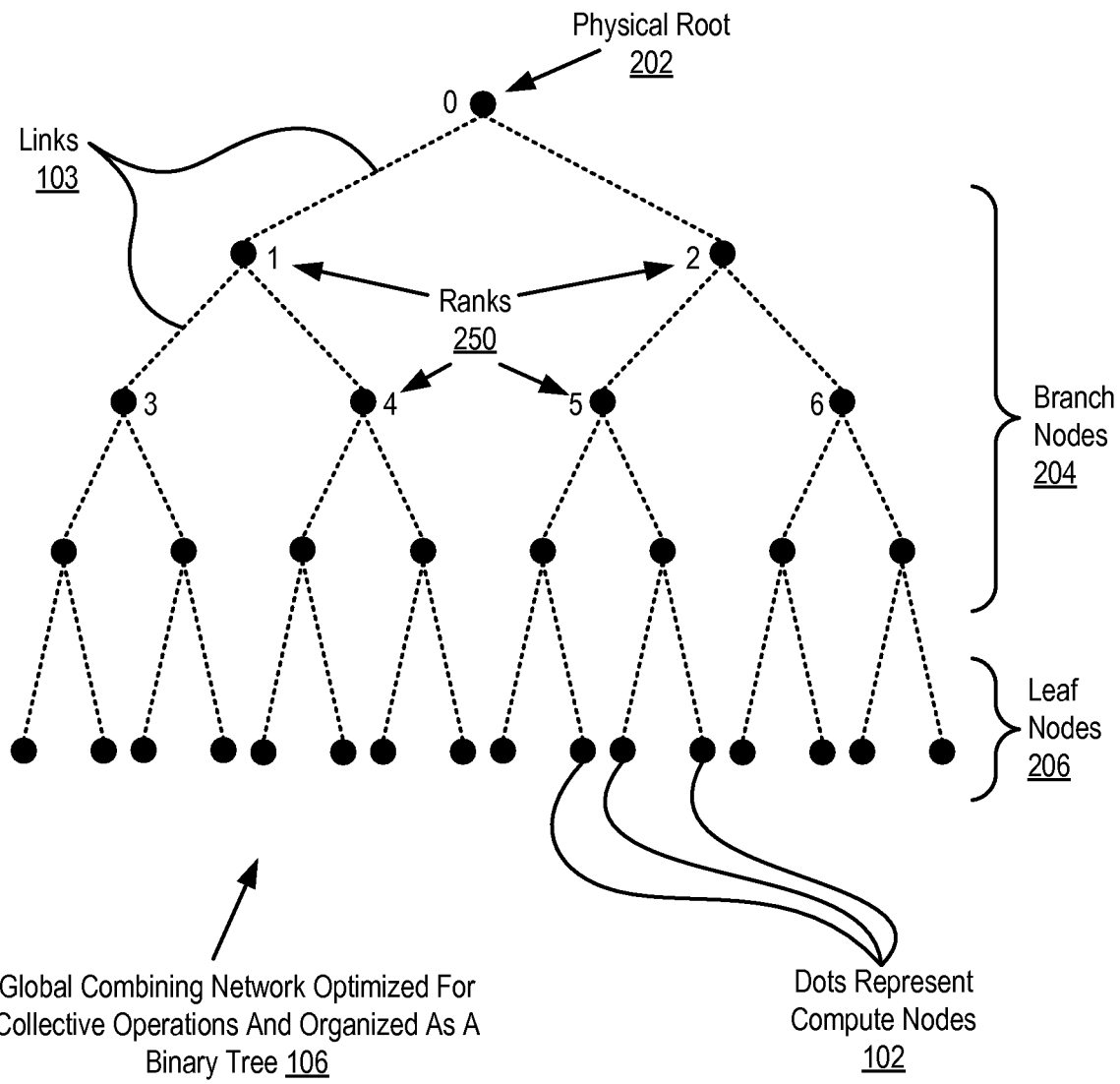
FIG. 5 sets forth a line drawing illustrating an exemplary data communications network optimized for collective operations useful in systems capable of thread selection during context switching on a plurality of compute nodes in accordance with embodiments of the present invention.

For further explanation, FIG. 5 sets forth a line drawing illustrating an exemplary data communications network (106) optimized for collective operations useful in systems capable of thread selection during context switching on a plurality of compute nodes in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in systems for thread selection during context switching on a plurality of compute nodes in accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
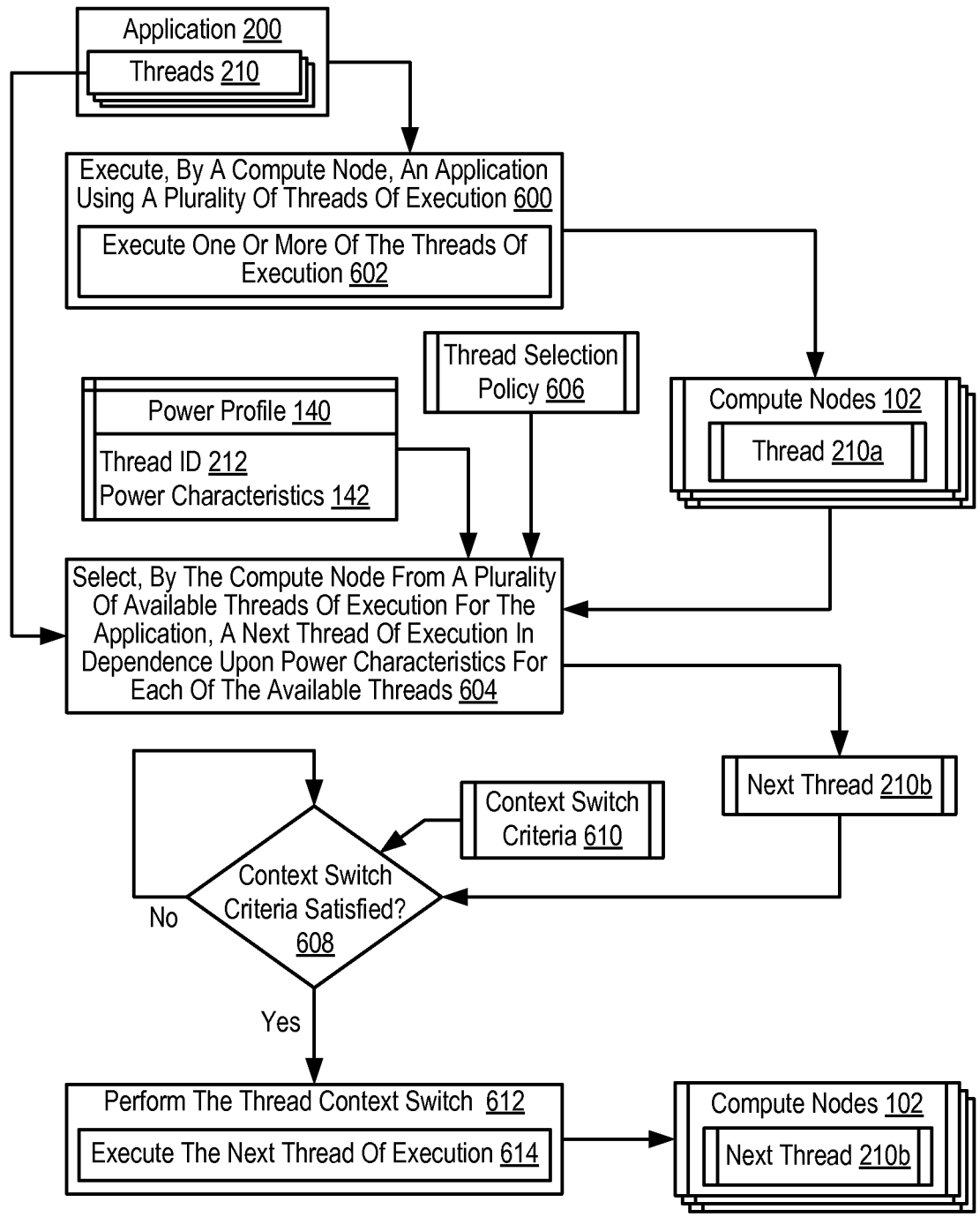
FIG. 6 sets forth a flow chart illustrating an exemplary method for thread selection during context switching on a plurality of compute nodes according to embodiments of the present invention.

For further explanation, FIG. 6 sets forth a flow chart illustrating an exemplary method for thread selection during context switching on a plurality of compute nodes (102) according to embodiments of the present invention. The compute nodes (102) described with reference to FIG. 6 are connected together for data communications using a plurality of data communications networks. At least one of the data communications networks is optimized for point to point operations such as, for example, the torus network described above, and at least one of the data communications is optimized for collective operations such as, for example, the tree network described above.

The method of FIG. 6 includes executing (600), by a compute node (102), an application (200) using a plurality of threads (210) of execution. The compute node (102) executes (600) the application (200) according to the method of FIG. 6 by executing (602) one or more of the threads (210a) of execution. Executing (602) one or more of the threads (210a) of execution according to the method of FIG. 6 may be carried out by configuring the compute node's processor with state information related to the thread (210a) to be executed including, for example, the program counter, instruction register, memory address register, memory buffer register, stack pointer, and so on, and instructing the compute node's processor to execute using the current state information of the processor.

The method of FIG. 6 also includes selecting (604), by the compute node (102) from a plurality of available threads (210) of execution for the application (200), a next thread (210b) of execution in dependence upon power characteristics (142) for each of the available threads (210). The available threads (210) of FIG. 6 are the threads of the application that can be executed concurrently with the thread (210a). The number of threads available for execution concurrently with thread (210a) will vary depending on the structure and design of the application (200). The next thread (210b) of FIG. 6 is the thread that will replace the current thread (210a) for execution on the compute node's processor during the next context switch. The compute node selects (604) the next thread (210b) from the plurality of available threads (210) according to the method of FIG. 6 by identifying which one of the available threads (210) is associated in the power profile (140) with the power characteristics (142) that are currently desired for execution. In the example of FIG. 6, the desirability of certain power characteristics is specified in the thread selection policy (606). For example, the thread selection policy (606) of FIG. 6 may specify that threads associated with low power consumption should be executed after threads associated with high power consumption to eliminate the possibility that all of the compute nodes will execute threads with high power consumption for any prolonged duration.

Readers will note that the next thread (210b) of execution may be implemented as a software thread or a hardware thread. A hardware thread is a thread having state information implemented exclusively using computer hardware and hardware data structures such as, for example, hardware registers and hardware counters. A hardware thread is a thread through which software threads are run. For example, in a symmetric multi-processing architecture, each compute node has multiple processing cores, thereby each compute nodes supports multiple hardware threads. A software thread is a thread having state information implemented in software data structures such as, for example, a thread information block of an operating system kernel.

The method of FIG. 6 also includes determining (608), by the compute node (102), whether criteria (610) for a thread context switch are satisfied. As mentioned above, a thread context switch is a computing process of storing the state, or 'context,' of a processor currently executing a thread and reconfiguring the processor with another state for executing another thread. The context switch criteria (610) of FIG. 6 represent conditions that when satisfied instruct a processor to perform a context switch. The context switch criteria (610) of FIG. 6 may specify to perform a thread context switch when the current thread (210a) releases a processing semaphore, when a certain number of instructions have been processed, when a predefined period of time has elapsed, or any other criteria as will occur to those of skill in the art.

The method of FIG. 6 includes performing (612), by the compute node (102), the thread context switch if the criteria (610) for a thread context switch are satisfied. The compute node (102) may perform (612) the thread context switch according to the method of FIG. 6 by storing the state information for the current thread (210a) in hardware or software data structures and configuring the processor with the state information for the next thread (210b). Performing (612) the thread context switch according to the method of FIG. 6 includes executing (614) the next thread (210b) of execution. The compute node may execute (614) the next thread (210b) of execution according to the method of FIG. 6 by instructing the compute node's processor to execute using the configured state information in the processor.

Figure 7:
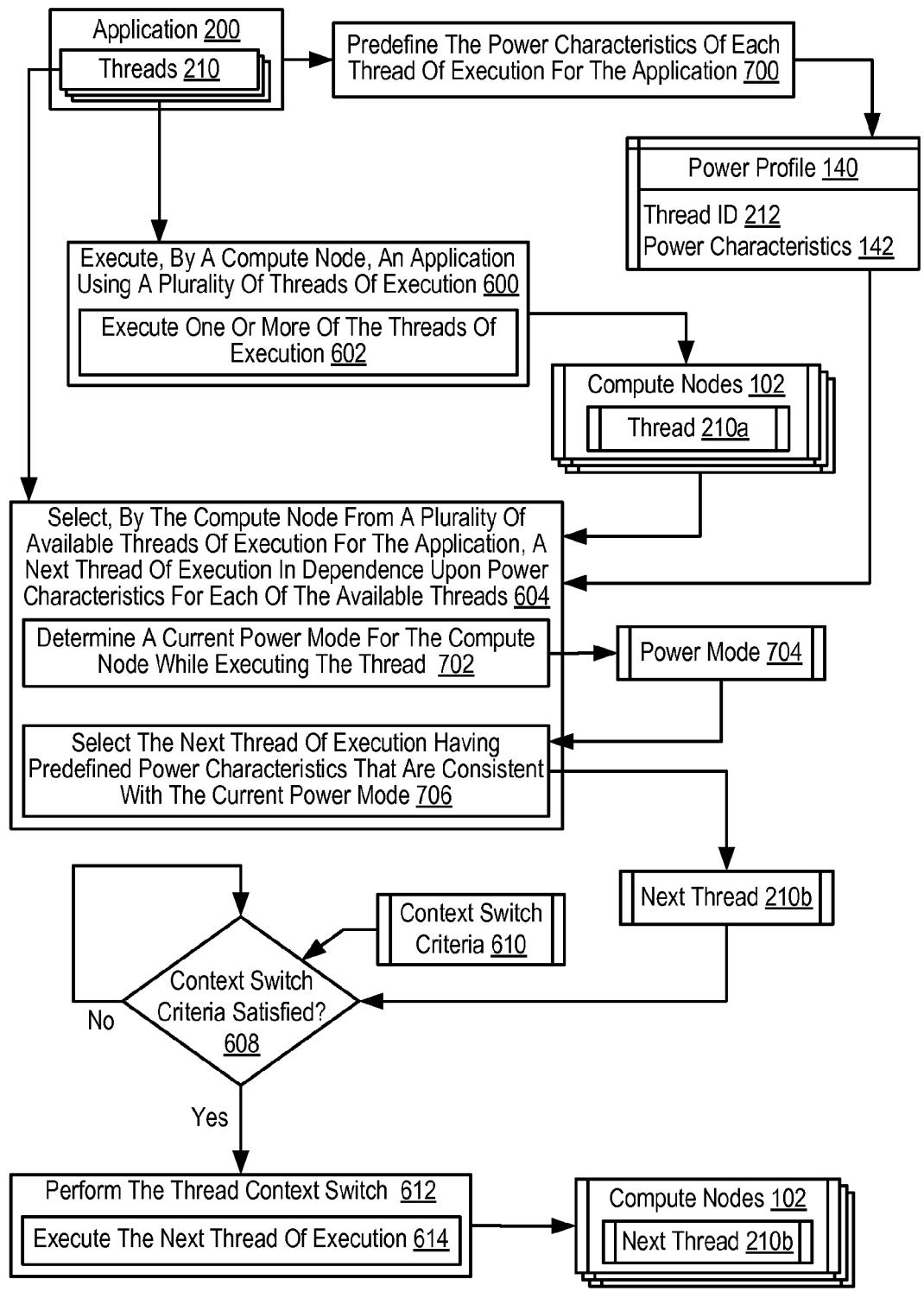
FIG. 7 sets forth a flow chart illustrating a further exemplary method for thread selection during context switching on a plurality of compute nodes according to embodiments of the present invention.

Turning now to FIG. 7, FIG. 7 sets forth a flow chart illustrating a further exemplary method for thread selection during context switching on a plurality of compute nodes according to embodiments of the present invention. The compute nodes (102) described with reference to FIG. 7 are connected together for data communications using a plurality of data communications networks. At least one of the data communications networks is optimized for point to point operations such as, for example, the torus network described above, and at least one of the data communications is optimized for collective operations such as, for example, the tree network described above.

The method of FIG. 7 is similar to the method of FIG. 6. That is, the method of FIG. 7 includes: executing (600), by a compute node (102), an application (200) using a plurality of threads (210) of execution, including executing (602) one or more of the threads (210a) of execution; selecting (604), by the compute node (102) from a plurality of available threads (210) of execution for the application (200), a next thread (210b) of execution in dependence upon power characteristics (142) for each of the available threads (210); determining (608), by the compute node (102), whether criteria (610) for a thread context switch are satisfied; and performing (612), by the compute node (102), the thread context switch if the criteria (610) for a thread context switch are satisfied, including executing (614) the next thread (210b) of execution.

The method of FIG. 7, however, also includes predefining (700) the power characteristics (142) of each thread (210) of execution for the application (200). Predefining (700) the power characteristics (142) of each thread (210) of execution for the application (200) according to the method of FIG. 7 may be carried out by a compute node or a service node. Such nodes may predefine (700) the power characteristics (142) of each thread (210) of execution for the application (200) according to the method of FIG. 7 by executing each of the threads (210) while monitoring the overall power consumption of the compute nodes (102) or the power consumption of the individual components of the compute nodes (102). The power characteristics (142) for each thread (210) may be implemented as the actual power consumption measured, typically expressed in Watts, or as textual semantics derived from comparing the measured power consumption to a conversation table. For example, the power characteristics (142) may be implemented as a value of 'high' when the measured power consumption is above a threshold value and 'low' when the measured power consumption is below a threshold value. The power consumption during execution may be measured using voltage and current sensors in the voltage regulators that supply power to the node's components. The node's processor or a service processor may aggregate these voltage and current measurements and provide them to the software module predefining (700) the power characteristics (142) for each thread (210). The processor or the service processor may connect to the sensors through an out of band bus such as, for example, a JTAG network, an Inter-Integrated Circuit ('I2C') bus, System Management Bus ('SMB'), and so on.

In some other embodiments, such nodes may predefine (700) the power characteristics (142) of each thread (210) of execution for the application (200) according to the method of FIG. 7 by estimating the power consumption of the compute node based on performance data such as, for example, the number of floating point operations, integer operations, cache misses, and so on occurring within a particular period of time during execution of each thread (210). The performance data may be actual measured performance during execution of a thread or simulated performance data gather from simulating execution of an application entirely in a development environment. The power characteristics (142) of FIG. 7 are stored in a power profile (140). The power profile (140) of FIG. 7 is a data structure that associates the power characteristics (142) with threads (210) of the application (200). Each record of the power profile (140) includes a thread identifier (212) and the power characteristics (142) for the thread (210) specified by the thread identifier (212).

In the method of FIG. 7, selecting (604), by the compute node (102), a next thread (210b) from a plurality of available threads (210) of execution for the application (200) includes: determining (702) a current power mode (704) for the compute node (102) while executing the thread (210a) of the application (200); and selecting (706), from the available threads (210) of execution, the next thread (210b) of execution having predefined power characteristics (142) that are consistent with the current power mode (704). In the example of FIG. 7, the power mode (704) describes the power consumption of the compute node. For example, the power mode (704) may describe the power mode of the compute node (102) as 'high' or 'low.' In the example of FIG. 7, a compute node may determine (702) the current power mode (704) for the compute node (102) while executing the thread (210a) of the application (200) by comparing the power consumption of the compute node with power mode criteria that specify a power mode for the node based on various values of power consumption. For example, when the power consumption of the compute node exceeds a certain threshold established in the power mode criteria, then the power mode criteria may specify the power mode of the compute node is 'high.'

Readers will note that power characteristics for a thread (210) are consistent with a power mode (704) for the compute node (102) when executing the thread with those power characteristics will allow the compute node to operate in a particular power mode. In some embodiments, the current power mode (704) for the compute node (102) may be specified by a power mode switching algorithm that provides the node with advice regarding which power mode the node should be in at any given time. In such embodiments, the compute nod may select (706) the next thread (210b) of execution having predefined power characteristics (142) that are consistent with the current power mode (704) according to the power mode switching algorithm. For example, the power mode switching algorithm may recommend that the compute node follow a period of processing in a 'high' power mode with a period of processing in a 'low' power mode. In such an example, the compute node may select as the next thread for execution one of the available threads that has a power characteristics indicating that executing that thread would allow the compute node to enter a 'low' power mode.

In other embodiments, the current power mode (704) may be specified by external operating conditions of the compute node (102). The operating conditions are 'external' in the sense that these operating conditions are imposed on the operation of the compute nodes from entities outside of the compute node. These external operating conditions may include power consumption maximums imposed by a system administrator for a set of compute nodes in a rack or a room, cooling considerations, pricing of electricity to power the compute nodes, or any other external operating conditions as will occur to those of skill in the art. In such embodiments, the compute nod may select (706) the next thread (210b) of execution having predefined power characteristics (142) that are consistent with the current power mode (704) by selecting the next thread (210b) according to those external operating conditions. That is, the compute node (102) may select the next thread (210b) with the power characteristics (142) that allow the compute node to operate with the parameters defined by the external operating conditions.

Exemplary embodiments of the present invention are described largely in the context of a fully functional computer system for thread selection during context switching on a plurality of compute nodes. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of thread selection for context switching on a plurality of compute nodes, the method comprising:

executing, by a compute node of the plurality of compute nodes, an application using a plurality of threads of execution, including executing one or more of the threads of execution;

predefining power characteristics for each of the plurality of threads of execution for the application;

selecting, by the compute node from a plurality of available threads of execution for the application, a next thread of execution in dependence upon power characteristics for each of the available threads by determining a current power mode for the compute node while executing a current thread of the application, and selecting, from the available threads of execution, the next thread of execution having predefined power characteristics that are consistent with the current power mode;

determining, by the compute node, whether a criteria for a thread context switch is satisfied; and performing, by the compute node, the thread context switch if the criteria for a thread context switch are satisfied, including executing the next thread of execution.

2. The method of claim 1 wherein the next thread of execution is a software thread.

3. The method of claim 1 wherein the next thread of execution is a hardware thread in a Symmetric Multi-Processing ('SMP') architecture.

4. The method claim 1 wherein selecting, from the available threads of execution, the next thread of execution having predefined power characteristics that are consistent with the current power mode further comprises selecting the next thread according to a power mode switching algorithm.

5. The method claim 1 wherein selecting, from the available threads of execution, the next thread of execution having predefined power characteristics that are consistent with the current power mode further comprises selecting the next thread according to external operating conditions for the compute node.

6. The method claim 1 wherein the plurality of compute nodes are connected together for data communications using a plurality of data communications networks, at least one of the data communications networks optimized for point to point operations, and at least one of the data communications networks optimized for collective operations.

7. A parallel computer capable of thread selection for context switching on a plurality of compute nodes, the parallel computer comprising the plurality of compute nodes, each of the compute nodes comprising one or more computer processors and computer memory operatively coupled to the computer processors, the computer memory having disposed within it computer program instructions capable of:

executing, by a compute node of the plurality of compute nodes, an application using a plurality of threads of execution, including executing one or more of the threads of execution;

predefining power characteristics of each of the plurality of threads of execution for the application;

selecting, by the compute node from a plurality of available threads of execution for the application, a next thread of execution in dependence upon power characteristics for each of the available threads by determining a current power mode for the compute node while executing a current thread of the application, and selecting, from the available threads of execution, the next thread of execution having predefined power characteristics that are consistent with the current power mode;

determining, by the compute node, whether a criteria for a thread context switch is satisfied; and performing, by the compute node, the thread context switch if the criteria for a thread context switch are satisfied, including executing the next thread of execution.

8. The parallel computer claim 7 wherein selecting, from the available threads of execution, the next thread of execution having predefined power characteristics that are consistent with the current power mode further comprises selecting the next thread according to a power mode switching algorithm.

9. The parallel computer claim 7 wherein selecting, from the available threads of execution, the next thread of execution having predefined power characteristics that are consistent with the current power mode further comprises selecting the next thread according to external operating conditions for the compute node.

10. A computer program product for thread selection for context switching on a plurality of compute nodes, the computer program product disposed upon a computer readable recordable medium, wherein the computer readable recordable medium is not a signal, the computer program product comprising computer program instructions capable of:

executing, by a compute node of the plurality of compute nodes, an application using a plurality of threads of execution, including executing one or more of the threads of execution;

predefining the power characteristics of each of the plurality of threads of execution for the application;

selecting, by the compute node from a plurality of available threads of execution for the application, a next thread of execution in dependence upon power characteristics for each of the available threads by determining a current power mode for the compute node while executing a current thread of the application, and selecting, from the available threads of execution, the next thread of execution having predefined power characteristics that are consistent with the current power mode;

determining, by the compute node, whether a criteria for a thread context switch is satisfied; and performing, by the compute node, the thread context switch if the criteria for a thread context switch are satisfied, including executing the next thread of execution.

11. The computer program product of claim 10 wherein the next thread of execution is a software thread.

12. The computer program product of claim 10 wherein the next thread of execution is a hardware thread in a Symmetric Multi-Processing ('SMP') architecture.

13. The computer program product of claim 10 wherein selecting, from the available threads of execution, the next thread of execution having predefined power characteristics that are consistent with the current power mode further comprises selecting the next thread according to a power mode switching algorithm.

14. The computer program product of claim 10 wherein selecting, from the available threads of execution, the next thread of execution having predefined power characteristics that are consistent with the current power mode further comprises selecting the next thread according to external operating conditions for the compute node.

15. The computer program product of claim 10 wherein the plurality of compute nodes are connected together for data communications using a plurality of data communications networks, at least one of the data communications networks optimized for point to point operations, and at least one of the data communications networks optimized for collective operations.

* * * * *